(12) United States Patent
Grande et al.

(10) Patent No.: US 8,443,660 B2
(45) Date of Patent: May 21, 2013

(54) DEVICE FOR DETERMINING A CONTACT SURFACE LENGTH OF A VEHICLE TIRE

(75) Inventors: Guido Grande, Hannover (DE); Mario Haselsteiner, Cham (DE); Otto Müller, Pettendorf/Adlersberg (DE)

(73) Assignee: Continental Automotive GmbH, Hannover (DE)

( * ) Notice: Subject to any disclaimer, the term of this patent is extended or adjusted under 35 U.S.C. 154(b) by 239 days.

(21) Appl. No.: 12/964,061

(22) Filed: Dec. 9, 2010

(65) Prior Publication Data

US 2011/0132080 A1 Jun. 9, 2011

(30) Foreign Application Priority Data

Dec. 9, 2009 (DE) .......... 10 2009 057 596

(51) Int. Cl.
*G01M 17/02* (2006.01)
(52) U.S. Cl.
USPC .......................................... 73/146; 340/442
(58) Field of Classification Search .......... None
See application file for complete search history.

(56) References Cited

U.S. PATENT DOCUMENTS

| | | | | |
|---|---|---|---|---|
| 5,749,984 A * | 5/1998 | Frey et al. | ..................... | 152/415 |
| 6,378,360 B1 | 4/2002 | Bartels | | |
| 6,438,193 B1 * | 8/2002 | Ko et al. | ..................... | 377/24.1 |
| 6,763,288 B2 * | 7/2004 | Caretta et al. | ..................... | 701/1 |
| 6,888,471 B2 | 5/2005 | Elsner et al. | | |
| 6,959,593 B2 * | 11/2005 | Mancosu et al. | ................. | 73/146 |
| 7,132,939 B2 * | 11/2006 | Tyndall et al. | ................ | 340/447 |
| 7,543,491 B2 * | 6/2009 | Hammerschmidt et al. | . . | 73/146.5 |
| 7,603,894 B2 * | 10/2009 | Breed | ............................. | 73/146 |
| 2004/0036590 A1 | 2/2004 | Elsner et al. | | |
| 2006/0109100 A1 | 5/2006 | Iijima | | |
| 2009/0071237 A1 | 3/2009 | Hammerschmidt et al. | | |

FOREIGN PATENT DOCUMENTS

| | | |
|---|---|---|
| DE | 19702768 C1 | 4/1998 |
| EP | 1655152 A1 | 5/2006 |
| WO | 0189896 A1 | 11/2000 |

* cited by examiner

*Primary Examiner* — Lisa Caputo
*Assistant Examiner* — Jermaine Jenkins
(74) *Attorney, Agent, or Firm* — Laurence A. Greenberg; Werner H. Stemer; Ralph E. Locher

(57) ABSTRACT

An apparatus ascertains a contact area length of a vehicle tire. The apparatus has a transmission unit which has a resonator and which is set up to transmit a sensor signal at a defined frequency. A change in the frequency of the sensor signal on the basis of mechanical excitation of the resonator is indicative of a contact area length for the vehicle tire. Furthermore, the apparatus has a contact area length ascertainment unit which is set up to receive the sensor signal and to take the change in the frequency of the sensor signal as a basis for ascertaining the contact area length of the vehicle tire.

16 Claims, 1 Drawing Sheet

DEVICE FOR DETERMINING A CONTACT
SURFACE LENGTH OF A VEHICLE TIRE

BACKGROUND OF THE INVENTION

FIELD OF THE INVENTION

The invention relates to an apparatus for ascertaining a contact area length for a vehicle tire.

The invention also relates to a vehicle.

The invention also relates to a method for ascertaining a contact area length for a vehicle tire.

Furthermore, the invention relates to a program element.

The invention also relates to a computer-readable storage medium.

Modern motor vehicles form complex systems of hardware and software. The regulation and control of the mechatronic system of an automobile involves the use of a large number of very different controllers. Intelligent tire pressure control systems also allow the measurement of a contact area length during the operation of the motor vehicle.

The contact area of a tire denotes the tire footprint or a magnitude which is indicative of the tire footprint. Such a magnitude is particularly the length of the contact area, that is to say the length measured in the direction of travel, along which the tire is in contact with the road. During travel, the tire footprint on an automobile is frequently only approximately as large as the palm of a hand. On a motorcycle, it is even smaller. The contact area of a tire, to be more precise the contact area length, can be ascertained by using a piezo element in the tire. However, this requires special assemblies which can be used only in this context.

BRIEF SUMMARY OF THE INVENTION

The invention is based on the object of providing an apparatus in which the contact area length of a tire can be ascertained with little complexity and reliably.

This object is achieved by the subject matter of the independent patent claims. Advantageous embodiments of the present invention are described in the dependent claims.

In accordance with a first aspect of the invention, an apparatus for ascertaining a contact area length for a vehicle tire is provided, wherein the apparatus has a transmission unit which has a resonator and which is set up to transmit a sensor signal at a defined frequency, wherein a change in the frequency of the sensor signal on the basis of mechanical excitation of the resonator is indicative of a contact area length for the vehicle tire. Furthermore, the apparatus has a contact area length ascertainment unit which is set up to receive the sensor signal and to take the frequency change in the sensor signal as a basis for ascertaining the contact area length of the vehicle tire.

In accordance with another exemplary embodiment of the invention, a vehicle (for example a motor vehicle, particularly a passenger vehicle or a heavy goods vehicle) having an apparatus having the aforementioned features for ascertaining a contact area length for a vehicle tire is provided.

In accordance with a further exemplary embodiment of the invention, a method for ascertaining a contact area length for a vehicle tire is provided. The method involves a sensor signal being transmitted at a defined frequency by a transmission unit which has a resonator, wherein a change in the frequency of the sensor signal on the basis of mechanical excitation of the resonator is indicative of a contact area length for the vehicle tire. Furthermore, the method involves the sensor signal being received and the contact area length of the vehicle tire being ascertained on the basis of the frequency change in the sensor signal.

A computer-readable storage medium according to one exemplary embodiment of the present invention stores a program for measuring a contact area for a tire, which program is set up to perform or control the method having the features described above when it is executed by a processor.

A program element (computer program element) according to one exemplary embodiment of the present invention for measuring a contact area for a tire has the method steps described above (or controls said method steps or performs them) when it is executed.

Exemplary embodiments of the present invention can be implemented both by means of a computer program, that is to say a piece of software, and by means of one or more special electrical circuits, that is to say in hardware, or in any hybrid form, that is to say by means of software components and hardware components.

The various "units", particularly the sensor unit and the contact area length ascertainment unit, can be understood within the context of this invention to mean a processor or a portion of a processor, respectively, which implements the respective functions of the relevant unit. Each unit may be in the form of a separate processor, or a plurality of or all units may be in the form of portions of a common processor.

Within the context of this application, a "contact area" can be understood to mean a characteristic relating to the tire footprint on a bed such as a road. In this context, the characteristic of a contact area may denote the surface area or else the geometry of the coverage of the contact area, for example the description of a rectangular or essentially trapezoidal contact area configuration.

By contrast, a "contact area length" can be understood to mean the length of a surface section of a tire which is in contact with a bed such as a road.

In particular, a "resonator" can be understood to mean a mechanical resonator which, upon mechanical excitation, decays at a particular frequency (natural frequency). A tire may have different sensors which measure air pressure, temperature or acceleration, for example. These measured characteristics can then be transmitted by means of a transmission unit to a reception unit. Said transmission unit may have a resonator, inter alia. In the present case, said resonator can be used to determine the contact area length, since the resonator reacts with a change in frequency when excited by pressure.

When the vehicle tire is rolling on the road, the resonator of the transmission unit can be excited by pressure. As a result, the sensor signal can change frequency. This frequency change can then be used in the contact area length ascertainment unit to ascertain the contact area length. In this manner, it is possible to use already available assemblies for ascertaining the contact area length, which means that it is possible to dispense with the additional use of a piezo element, for example.

Additional embodiments of the apparatus are described below. These also apply to the vehicle, to the method, to the program element and to the computer-readable storage medium.

The contact area length ascertainment unit may have a comparison unit which is set up to compare the frequency of the sensor signal with a reference frequency. In this case, the reference frequency may be a frequency at which the sensor signal is transmitted without mechanical action.

In addition, the contact area length ascertainment unit may have an evaluation unit which is set up to ascertain the contact area length on the basis of the output signal from the comparison unit. In this context, the start and end of the frequency change can be recognized. From these, it is then possible to ascertain the contact area length of the vehicle tire.

The resonator may be a mechanical resonator and particularly a quartz oscillator. A quartz oscillator or crystal may be a platelet which has been cut from a piezoelectric quartz crystal and which is metalized and contact-connected on both sides and is mounted freely in an air-tight housing, said crystal being held either only by the connections or partly by additional contact points, particularly in the case of crystals for tire pressure control systems. Such a resonator or crystal can be used in transmission apparatuses, for example. The mechanical excitation is usually not desired, but in the present application can be used for ascertaining the contact area length, which means that no additional piezo elements are required.

The transmission unit and the contact area length ascertainment unit may be set up to communicate via a radio link. In this way, the transmission unit may be arranged in the vehicle tire and the contact area length ascertainment unit can be arranged at another location in the vehicle.

A resonator can influence a sensor signal, the change in the frequency of the sensor signal being indicative of the contact area length in the center of the respective tire cross section.

In accordance with one exemplary embodiment, the apparatus may be in the form of a tire module. In other words, the apparatus may be provided as a modular component which can be arranged integrally on or in a tire and, by way of example, forwards appropriate tire position information to vehicle electronics. Alternatively, the apparatus may at least partially be in the form of a vehicle electronics module, that is to say may be directly part of the vehicle electronics.

Additional embodiments of the vehicle are described below. These also apply to the apparatus, to the method, to the program element and to the computer-readable storage medium.

By way of example, the vehicle may be an automobile (for example a motor vehicle, particularly a passenger vehicle or heavy goods vehicle). Alternatively, it is possible for the apparatus according to the invention to be implemented in a train or the like.

It is pointed out that embodiments of the invention have been described with reference to different subject matter of the invention. In particular, some embodiments of the invention have been described by means of apparatus claims and other embodiments of the invention have been described by means of method claims. However, it becomes immediately clear to a person skilled in the art upon reading this application that, unless explicitly stated otherwise, in addition to a combination of features which are associated with one type of subject matter of the invention, any combination of features which are associated with different types of subject matter of the invention is also possible.

Further advantages and features of the present invention can be found in the exemplary description of currently preferred embodiments which follows. The individual figures of the drawing for this application should be regarded merely as schematic and not to scale.

DESCRIPTION OF THE INVENTION

Figure 1:
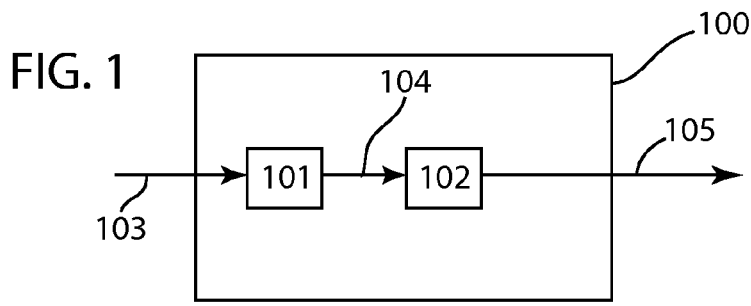
FIG. 1 schematically shows an apparatus for ascertaining a contact area length for a vehicle tire based on an exemplary embodiment of the invention.

Identical or similar components in different figures have been provided with the same reference numerals.

In accordance with one exemplary embodiment of the invention, a system is provided which allows the contact area length of a vehicle tire to be ascertained using already available assemblies.

The basis of one exemplary embodiment of the invention is a vehicle tire with the capability of measuring different features or characteristics of tires, such as air pressure, temperature, acceleration, by means of sensors. Such tire systems usually have transmission units which are used to transmit the results from the sensors to a reception unit. For the purpose of measuring the contact area length of a vehicle tire (that is to say the length of the tire footprint on the road), dedicated sensors such as piezo elements or strain gauges have been used to date.

The text below refers to FIG. 1 in describing an apparatus 100 for ascertaining a contact area length for a vehicle tire based on an exemplary embodiment of the invention.

The apparatus 100 for ascertaining a contact area length for a vehicle tire has a transmission unit 101. Said transmission unit has a resonator. The transmission unit transmits a sensor signal 104, which can originate from any sensors, to a reception unit 102, which in this case is used as a contact area length ascertainment unit. Between the transmission unit and the contact area length ascertainment unit, a separate reception unit may also be arranged. The transmission unit 101 or the resonator contained therein has a disturbance signal 103 acting on it, for example pressure resulting from the movement of the tire over the road or from the contact area of the tire on the road. The contact area length ascertainment unit 102 outputs a signal 105 which contains the contact area length.

The contact area length ascertainment unit 102 may be coupled to an output unit which can be provided with the result of the contact area length ascertainment. By way of example, the output unit may be vehicle electronics which can use the ascertained contact area length of the vehicle tires for control purposes in the vehicle. It is also possible for the output unit to be a graphical user interface which can be used to inform a user about the contact area length of the tire. It is also possible for the output unit to directly initiate a measure, for example an alarm, if values outside an additional tolerance range are detected.

Figure 2:
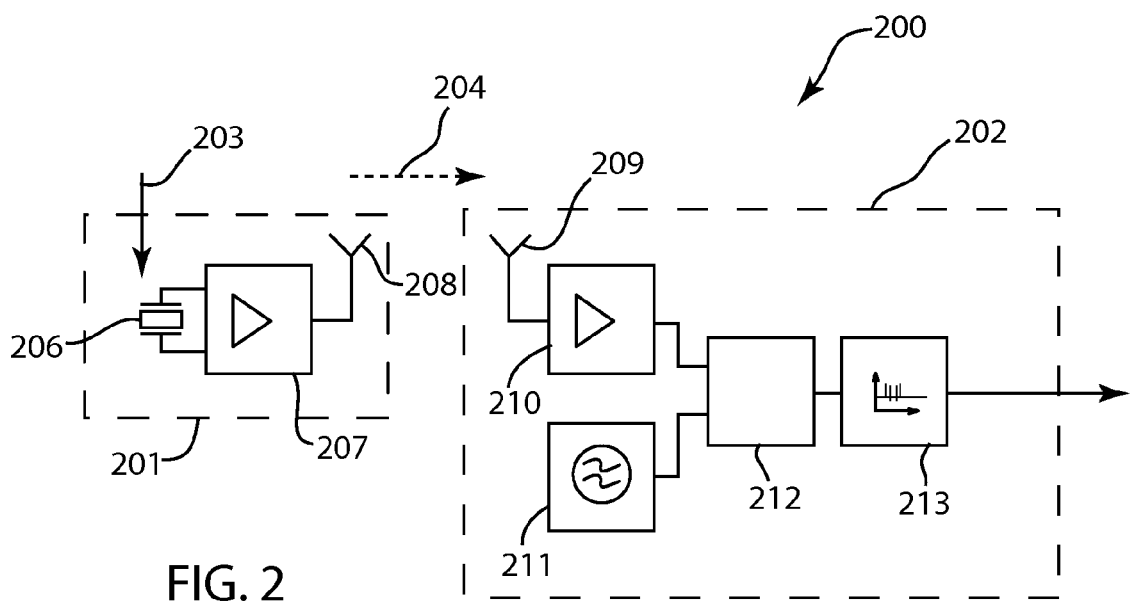
FIG. 2 schematically shows an apparatus for ascertaining a contact area length for a vehicle tire based on a further exemplary embodiment of the invention.

FIG. 2 shows an apparatus 200 for ascertaining a contact area length for a vehicle tire based on a further exemplary embodiment of the invention.

The apparatus 200 has a transmission unit 201 and a contact area length ascertainment unit 202. Said transmission unit has a resonator 206, for example a quartz oscillator. Said quartz oscillator is coupled to an amplifier 207. The transmitted signal may also be of more complex structure if the crystal frequency itself is not transmitted directly, but rather a radio-frequency signal which is produced from the crystal frequency by means of a synthesizer. The transmission unit 201 can use an antenna 208 to transmit a signal 204 via a radio link to the contact area length ascertainment unit 202. The transmission unit 201 or the resonator 206 can have a disturbance signal 203, for example pressure, acting on it, which changes the frequency of the transmitted signal 204.

The contact area length ascertainment unit 202 receives the signal 204 via an antenna 209. The signal is first of all supplied to an amplifier 210. The output of the amplifier 210 is coupled to a comparator or demodulator 212. Said comparator 212 compares the frequency of the transmitted or received signal 204 with the frequency of a reference signal 211. The result of the comparison is provided for an evaluation unit 213 by an output of the comparator 212. Said evaluation unit takes this result as a basis for ascertaining the contact area length of the vehicle tire.

Figure 3:
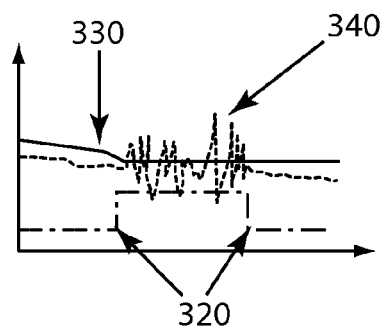
FIG. 3 shows a schematic graph of a frequency change in a sensor signal based on an exemplary embodiment of the invention.

FIG. 3 shows a schematic graph of a frequency change in a sensor signal based on an exemplary embodiment of the invention. Without the influence of a disturbance signal or without pressure on the road, the transmitted signal (sensor signal) has a defined frequency 330. Under the influence of a disturbance signal, or in the event of a mechanical action on the transmission unit and hence on the resonator, the resonator starts to oscillate out of line with its natural resonant frequency, as a result of which the frequency of the sensor signal likewise changes 340. By ascertaining the start end of this frequency change, it is possible to ascertain the contact area length 320 of the vehicle tire.

It is pointed out that the embodiments described herein are merely a limited selection of possible variant embodiments of the invention. It is thus possible to combine the features of individual embodiments with one another in a suitable manner, so that a person skilled in the art can regard the variant embodiments which are explicit here as disclosing a large number of different embodiments in obvious fashion.

The invention claimed is:

1. An apparatus for ascertaining a contact area length of a vehicle tire, the apparatus comprising:
    a transmission unit including a mechanical resonator being mechanically excited by pressure, said transmission unit being configured to transmit a sensor signal at a defined frequency, wherein a change in the frequency of the sensor signal is based on the mechanical excitation of said mechanical resonator and is indicative of a contact area length of the vehicle tire; and
    a contact area length ascertainment unit configured to receive the sensor signal and to use the change in the frequency of the sensor signal as a basis for ascertaining the contact area length of the vehicle tire.

2. The apparatus according to claim 1, wherein said contact area length ascertainment unit comprises a comparison unit configured to compare the frequency of the sensor signal with a reference frequency.

3. The apparatus according to claim 2, wherein said contact area length ascertainment unit comprises an evaluation unit connected to receive an output signal from said comparison unit and configured to ascertain the contact area length based on the output signal from said comparison unit.

4. The apparatus according to claim 1, wherein said mechanical resonator is a quartz oscillator.

5. The apparatus according to claim 1, wherein said transmission unit and said contact area length ascertainment unit are configured to communicate via a radio link.

6. The apparatus according to claim 1, configured as a tire module.

7. The apparatus according to claim 1, configured as a vehicle electronics module.

8. A vehicle, comprising an apparatus for ascertaining a contact area length for a vehicle tire according to claim 1.

9. The apparatus according to claim 1, wherein said mechanical resonator is a crystal being mechanically excited by the pressure.

10. the apparatus according to claim, further comprising:
    an air-tight housing;
    said mechanical resonator being a platelet mounted freely in said air-tight housing; and
    said platelet having two sides and being contact-connected on said two sides.

11. A method of ascertaining a contact area length of a vehicle tire, the method which comprises:
    transmitting a sensor signal at a defined frequency from a transmission unit, the transmission unit having a mechanical resonator being mechanically excited by pressure, wherein a change in the frequency of the sensor signal is based on the mechanical excitation of the mechanical resonator and is indicative of the contact area length of the vehicle tire;
    receiving the sensor signal; and
    ascertaining the contact area length of the vehicle tire based on the change in the frequency of the sensor signal.

12. A computer-readable storage medium having stored thereon a program for ascertaining a contact area length for a vehicle tire, the program being configured, when executed by a computer, to perform or control the method according to claim 11.

13. A program element for ascertaining a contact area length for a vehicle tire which, when executed on a processor, is configured to perform or control the method according to claim 11.

14. The method according to claim 11, wherein the mechanical resonator is a quartz oscillator.

15. The method according to claim 11, wherein the mechanical resonator is a crystal being mechanically excited by the pressure.

16. The method according to claim 11, which further comprises:
    forming the mechanical resonator as a platelet that is mounted freely in an air-tight housing; and
    contact-connecting the platelet on both sides of the platelet.

* * * * *